Oct. 27, 1959     O. L. STEVENS     2,910,315

LOCKING MEANS

Filed April 22, 1957

INVENTOR
Oliver L. Stevens

BY *Walter J. Jagmin*

ATTORNEY

United States Patent Office 2,910,315
Patented Oct. 27, 1959

2,910,315

LOCKING MEANS

Oliver L. Stevens, Dallas, Tex.

Application April 22, 1957, Serial No. 654,389

1 Claim. (Cl. 287—52.09)

This invention relates to a locking means and more particularly to a locking means for rigidly securing collars, hubs or the like to shafts.

Conventional locking means for securing collars, hubs or the like to shafts usually consist of a set screw threaded in the collar or hub whose inner end engages the outer surface of the shaft or of a key disposed in aligned slots or grooves in the collar or hub and the shaft. The use of set screws mars the surface of the shaft since the inner end of the screw digs a crater in the shaft each time it is tightened. Moreover, the position of the collar or hub cannot be adjusted or shifted accurately about the shaft since the set screw tends to drift into an old crater and keep the collar or hub in the old position when a slight adjustment of the collar or hub is attempted. The use of a key and slot connection requires accurate positioning of the slots in the shaft especially where several collars or hubs are to be disposed on a shaft in different positions relative to one another. The cutting of the surface of the shaft by the slots where keys are used and by craters where set screws are used weakens the shaft and makes adjustment of the collars or hubs on the shaft in one case impossible and in the other difficult since the slots cannot be moved about the circumference of the shaft and the set screws tend to drift into old craters. It is therefore desirable that a locking means for collars or hubs be provided which permits the locking of a collar or hub in any position either longitudinally or circumferentially on a shaft, which does not require the cutting of longitudinal slots in the shaft and which does not result in the marring or wearing of the surface of the shaft.

Accordingly, it is an object of the invention to provide a new and improved locking means for rigidly securing collars, hubs or the like to shafts.

Another object is to provide a new and improved locking means for rigidly securing collars, hubs or the like to shafts which permits both circumferential and longitudinal adjustment of the collars or hubs on the shaft.

Still another object is to provide a new and improved locking means, of the type described above, which does not require the provision of a slot in the shaft on which the collar or hub is to be secured.

A further object is to provide a locking means, of the type described above, having locking members for engaging the shaft and the collar or hub at large surface areas whereby great locking forces may be exerted on the shaft and the collar and hub without marring the surface of the shaft.

A still further object of the invention is to provide a locking means, of the type described above, having a plurality of wedge members interposed between the shaft and the collar or hub and held in rigid relation thereto by a screw means.

Another object is to provide a locking means of the type described above wherein a lock ring is provided to hold the wedge members in a predetermined position in the collar or hub.

Still another object of the invention is to provide a collar or hub having a plurality of locking means held in a predetermined position in the collar or hub and having a means for moving the wedge members into rigid locking or wedging positions between the collar or hub and a shaft after the collar or hub is moved into desired position on the shaft.

Other objects and a fuller understanding of the invention may be had by referring to the following description and claim taken in conjunction with the accompanying drawing in which like parts are designated by like reference characters and in which:

Figure 1:
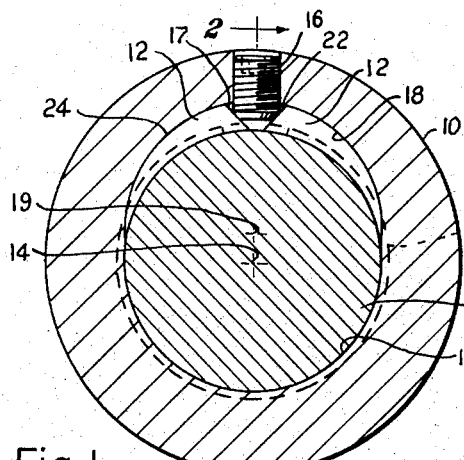
Figure 1 is a sectional view showing a collar provided with the locking means of the invention rigidly locked to a shaft.
Figure 2:
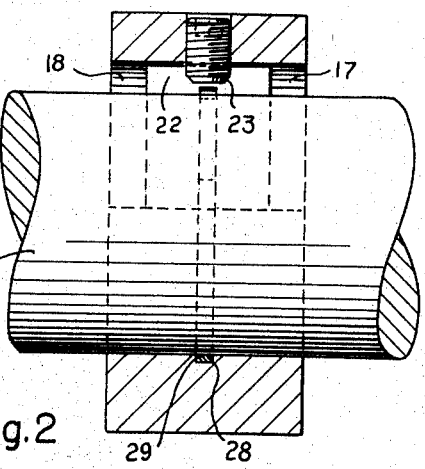
Figure 2 is a sectional view taken on line 2—2 of Figure 1.
Figure 3:
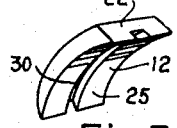
Figure 3 is a perspective view of one of the wedge members of the locking means shown in Figures 1 and 2.

Referring now particularly to Figures 1, 2 and 3 of the drawing, the reference character 10 designates a collar which is disposed on a shaft 11 and is rigidly secured or locked thereto by a pair of wedge members 12. The collar has an internal arcuate surface 13 having the axis 14 as its center which coincides with the longitudinal central axis of the shaft 11 whereby the surface 13 abuts the external surface of the shaft. The shaft engaging internal surface 13 defines an arc of more than 180° so that the collar cannot move radially in directions perpendicular to the axis 14 while it is free to rotate about the shaft or move along the shaft parallel to the axis 14 as long as the wedge members 12 are not moved into wedging or locking positions by the locking screw 16 threaded in the collar and extending therethru into an arcuate space or longitudinal groove 17, at its midpoint, between the shaft and the collar. The arcuate space 17 is created by an arcuate surface 18 having the axis 19 as its center. The arcuate surfaces 13 and 17 may have equal radii so that the arcuate groove may be easily cut by changing the location of the collar on the face plate of a lathe after the surface 13 has cut without moving the cutting tool.

The locking or wedge members 12 have inclined cam surfaces 22 which are engaged by the annular frusto-conical surface 23 of the locking screw 16 whereby the locking screw tends to cam the wedge members apart and into rigid locking engagement with the arcuate surface 18 of the collar and the surface of the shaft 11. The locking or wedge members have outer surfaces 24 of the same radius of curvature as the arcuate surface 18 of the collar whereby the whole outer surface of each wedge member contacts or abuts the arcuate surface 18 when the wedge members are in locking position. The wedge members 12 also have inner surfaces 25 of the same radius of curvature as the cylindrical surface of the shaft so that the whole inner surface of each wedge member contacts or abuts the shaft 11 when the wedge members are in locking position.

It will now be apparent that when the locking screw is rotated into the collar, its frusto-conical surface 23 engages the inclined cam surfaces 22 of the wedge members 12 and tends to move the wedge members away from each other and into wedging relation between the arcuate surface 18 of the collars and the cylindrical surface of the shaft. The large areas of the outer surfaces 24 and the inner surfaces 25 of the wedge members distribute the forces thus created over large areas of the collar and of the shaft so that neither the collar nor the shaft are gouged or marred by the wedge members. Moreover, the great forces created by the locking screw rigidly and immovably hold the collar against any movement relative to them.

In order to hold the wedge members 12 in predetermined positions in the collar against movement parallel to the axis 14, the collar is provided with an internal groove 28, disposed in the surface 13, which receives a split retaining ring 29. The internal surfaces 25 are provided with corresponding grooves 30 to receive the retaining ring and are thus held against movement in directions parallel to the central axis of the collar and also against rocking or pivotal movements about axis perpendicular to the central axis of the shaft.

It will be apparent that the retaining ring 29 is disposed in the groove 28 and projects into arcuate groove 17 so that the wedge members 12 may be assembled in the collar and held in the arcuate groove 17 by the split retaining ring, the split ring being of resilient substance such as steel, so that it may be deformed to permit insertion thereof into the groove 28 and the grooves 30 of the wedge members. The wedge members are moved toward each other to permit the collar to be moved or telescoped on the shaft to a predetermined position and the locking screw is rotated to move the wedge members apart to lock the collar on the shaft in the desired position.

It will be seen now that a new and improved collar or hub 10 has been illustrated and described which is provided with an internal arcuate longitudinal groove or recess 17 in which are disposed wedge members 12. It will also be seen that the wedge members are cammed apart into wedging relationship, between the collar and the shaft by a locking screw threaded in the collar which is movable into the arcuate recess 17 and between the wedge members 12 to contact the cam surfaces 22 thereof. It will also be seen that the wedge members do not mar the surface of the shaft since the surfaces 25 which contact the shaft have the same radius of curvature as the shaft and since the surfaces are relatively great. It will also be apparent that the wedge members are held in place against longitudinal movement relative to the central axis of the shaft by a retaining ring which is received in aligned grooves in the wedge members and in the collar.

It will also be seen that the collar can easily be moved or adjusted to any desired position on the shaft by merely unscrewing the locking screw, shifting the collar to the desired position and then again rotating the locking screw into engagement with the cam surfaces 22 of the wedge members.

Figure 4:
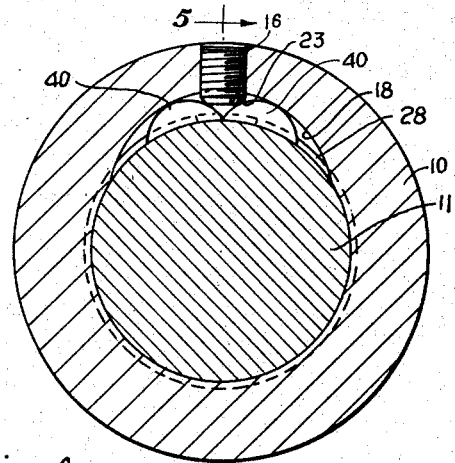
Figure 4 is a sectional view of a collar provided with a modified form of the locking means.
Figure 5:
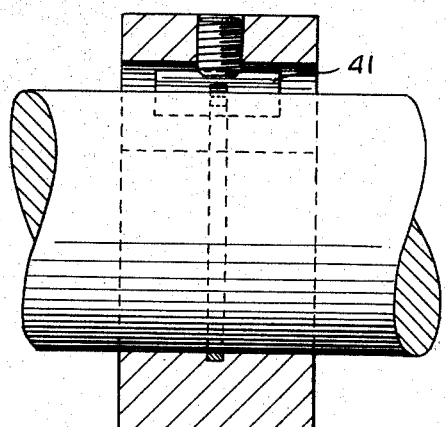
Figure 5 is a sectional view taken on line 5—5 of Figure 4.
Figure 6:
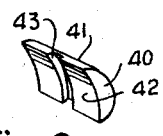
Figure 6 is a perspective view of one of the wedge members of the locking means shown in Figures 4 and 5.

In Figures 4, 5 and 6 is illustrated a modified form of the wedge members 12 in which the wedge members 40 have cylindrical outer surfaces 41 which contact the arcuate surface 18 defining the longitudinal groove 17 of the collar 10 and inner arcuate surfaces 42 which contact the surface of the shaft 11. The wedge members 40 are also provided with grooves 43 for receiving the retaining ring 29. It will be apparent that contact of the frusto-conical surface 23 of the locking screw 16 with the outer cylindrical surfaces 41 of the wedge members tend to move or cam the wedge members apart whereby the wedge members lock or hold the collar rigidly on the shaft in any predetermined position.

Figure 7:
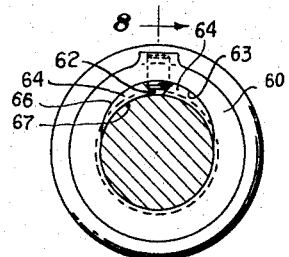
Figure 7 is a sectional view of a hub provided with still another modified form of the locking means.
Figures 8, 9:
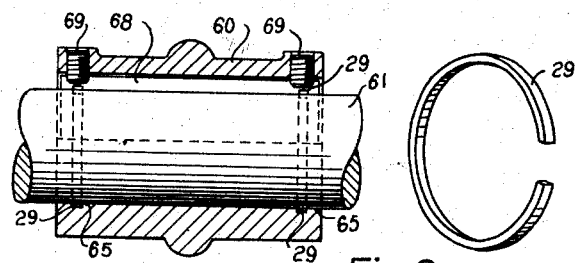
Figure 8 is a sectional view taken on line 8—8 of Figure 7.
Figure 9 is a perspective view of the lock ring employed to hold the wedge members in position in the collars or hub.

In Figures 7 and 8 is illustrated a further modified form of the locking means for collars or hubs where an elongate collar or hub 60, such as may be used to mount large wheels, not shown, on a shaft 61, is provided with a longitudinal arcuate recess or groove 62 which is defined by an arcuate surface 63. The wedge members 64 are held in the hub or collar by two split retaining rings 29 received in two grooves 65 of the collar or hub adjacent the ends thereof. The wedge members 64 are larger than the wedge members 12 although having similar outer surfaces 66, inner surfaces 67 and camming surfaces 68. A pair of locking screws 69 threaded in suitable bores in the collar or hub adjacent the ends thereof, engage the cam surfaces to move the wedge members 64 apart and into wedging engagement with the arcuate surface 63 of the collar and the outer surface of the shaft.

It will now be seen that the collars or hubs provided with the wedge members described may be used on any shaft and in any position on the shaft without in any way altering the shaft by marring its surface. It will also be seen that a plurality of such collars or hubs may be secured at different positions on the shaft and may be adjusted thereon in any way desired.

It will be apparent that various changes and modifications may be made in the above illustrated and described forms of the inventions without departing from the invention and it is intended in the appended claim to cover all such changes and modifications as fall within the true spirit and scope of the invention.

What I claim as new and desire to secure by Letters Patent of the United States is:

A device of the type described comprising: an annular member having a cylindrical inner surface, said annular member having an internal longitudinal recess in said cylindrical surface defined by an arcuate internal surface having an axis of curvature parallel to and displaced from the central longitudinal axis of the annular member; a pair of locking members disposed in said recess and having outer surfaces engageable with said arcuate internal surface and inner surfaces having a radius of curvature substantially equal to the radius of curvature of said cylindrical surface; and means on said annular member engageable with said locking members for moving said locking members apart and toward the central axis of said annular member, said annular member having an internal groove communicating with said recess, said locking members having grooves in said inner surfaces; and a retaining means disposed in said grooves for holding said locking members in said recess against movement parallel to the longitudinal central axis of said annular member.

References Cited in the file of this patent

UNITED STATES PATENTS

| | | |
|---|---|---|
| 77,747 | Miller et al. | May 12, 1868 |
| 309,142 | Hyde | Dec. 9, 1884 |
| 641,106 | Hawksworth | Jan. 9, 1900 |
| 687,864 | Smyth | Dec. 3, 1901 |
| 714,533 | Tazewell | Nov. 25, 1902 |
| 922,690 | Frankel | May 25, 1909 |
| 1,029,663 | Bowerstock | June 18, 1912 |
| 1,074,839 | Curry | Oct. 7, 1913 |
| 1,687,777 | McMurtrie et al. | Oct. 16, 1928 |
| 2,226,524 | Runge et al. | Dec. 24, 1940 |
| 2,676,809 | Smith | Apr. 27, 1954 |
| 2,812,200 | Yeargan | Nov. 5, 1957 |

FOREIGN PATENTS

| | | |
|---|---|---|
| 191,631 | Switzerland | Sept. 1, 1937 |